Jan. 26, 1954
H. M. LEONARD
2,667,545
AUTOMATIC DIRECTION SIGNAL
Filed Oct. 11, 1951
2 Sheets-Sheet 1
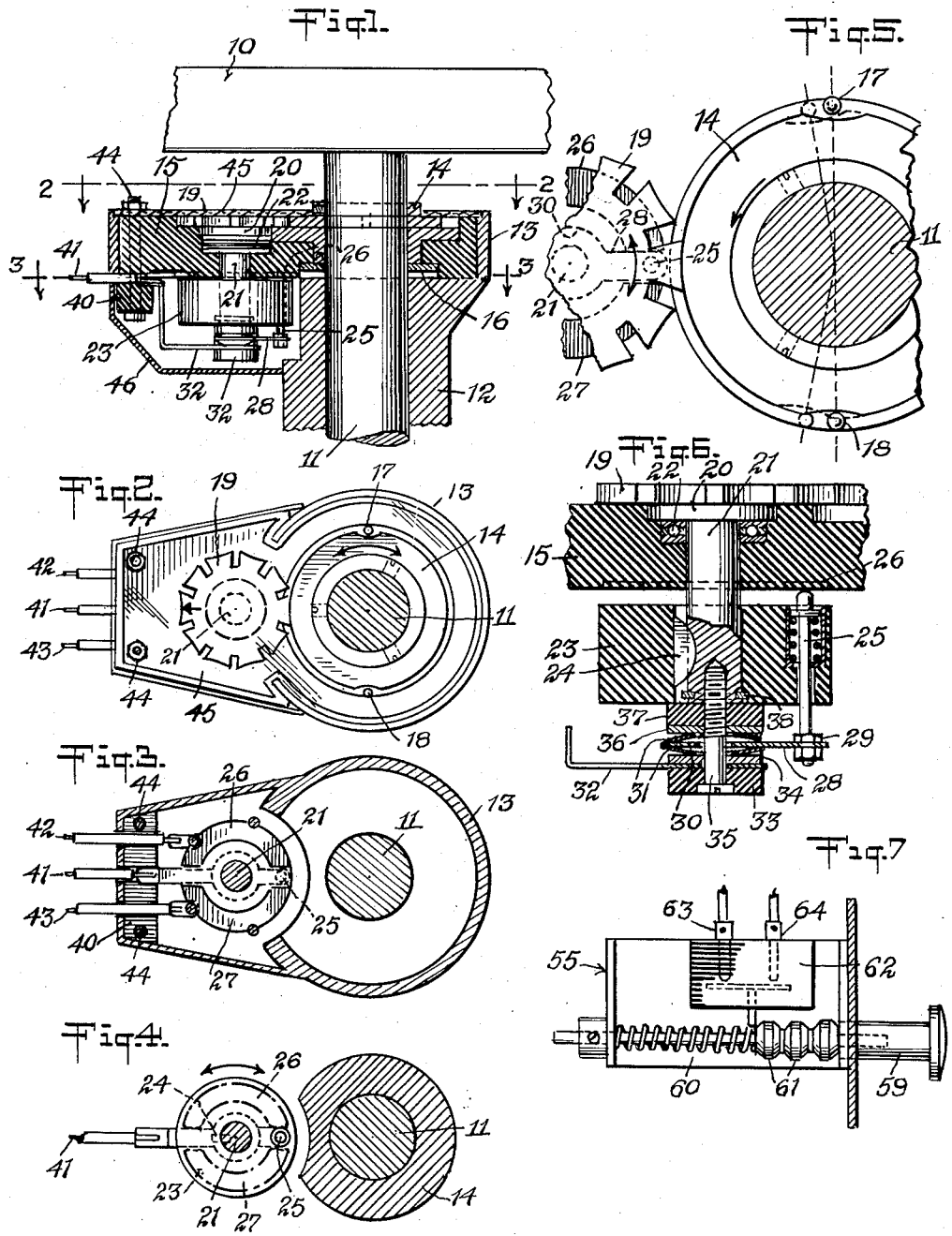
INVENTOR.
Henry M. Leonard
BY
Munn, Liddy & Nathanson
Attorneys Jan. 26, 1954 — H. M. LEONARD — 2,667,545
AUTOMATIC DIRECTION SIGNAL
Filed Oct. 11, 1951 — 2 Sheets-Sheet 2

INVENTOR.
Henry M. Leonard
BY
Munn, Liddy & Nathanson
Attorneys

Patented Jan. 26, 1954

2,667,545

UNITED STATES PATENT OFFICE 2,667,545

AUTOMATIC DIRECTION SIGNAL

Henry M. Leonard, Brooklyn, N. Y.

Application October 11, 1951, Serial No. 250,839

4 Claims. (Cl. 200—61.31)

This invention relates to an automatic direction signal or indicating device which may be used advantageously to cooperate with the steering column unit of an automobile.

One object of this invention is the provision of a device of the character mentioned which is entirely enclosed as an integral part of the steering column unit, and which operates in response to the movements of the steering wheel for the purpose of flashing correct signals when the driver of the vehicle is in the act of making a change of direction or contemplates making such change.

A further object of the invention is to provide the driver with a positive signal device enabling the manipulation of the steering wheel approximately eighty-nine degree free movment without flashing any signals, and also being adapted to any vehicle's steering wheel range of turns in either direction.

The present invention also provides an auxiliary indicating device whereby a driver in a parked vehicle may flash a signal indicating the vehicle is about to leave the curb, and also when contemplating a change in the direction of travel in conjunction with the conventional front and rear signals.

The indicating device serves as a telltale, a rear view mirror, a warning signal, a means for preventing accidents, an aid to persons capable of manipulating the steering wheel, but incapable due to handicaps from giving hand signals for contemplated changes in the direction of travel.

With the foregoing, other objects and advantages will appear when the following specification is read in conjunction with the accompanying drawings, in which Fig. 1 is a vertical sectional view of the control means of the present invention shown applied to a steering column unit only portions of which are shown, and the parts of said means being shown in their normal relationship.

Fig. 2 is a sectional view taken on the line 2—2 of Fig. 1.

Fig. 3 is a sectional view taken on the line 3—3 of Fig. 1.

Fig. 4 is a sectional view illustrating the relation of certain parts.

Fig. 5 is a sectional view showing certain parts in their normal relationship in full lines and also indicating a left turn of the steering wheel for signalling a left turn.

Fig. 6 is an enlarged fragmentary sectional view showing certain features of the control means.

Fig. 7 shows one of the manual switches.

Figure 8:
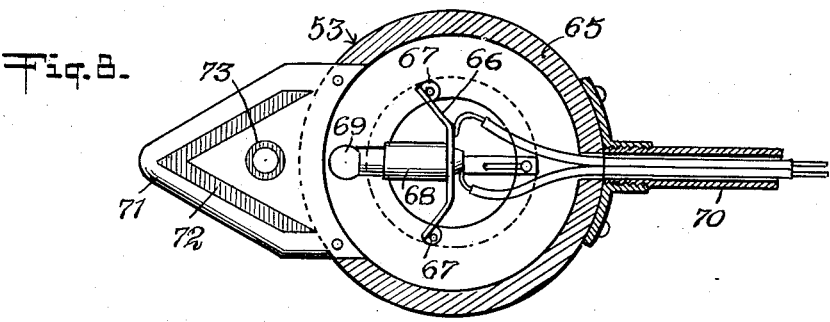
Fig. 8 is a side elevational view partly in section of a direction signal lamp.

The present invention includes front, rear and side electric direction lamps which are arranged on the body of a vehicle for observation by the drivers of other vehicles ahead and/or behind the vehicle in order to be apprised of contemplated intentions of a driver in driving or operating the vehicle.

In Fig. 1, of the drawings, there are shown portions of a steering column, said portions being of a steering wheel 10 on a steering shaft 11, and a stationary column jacket 12 having a housing 13 integral therewith or secured thereto. A wheel 14 is mounted for turning movement in a base 15 consisting of a molded block of insulating material. The wheel 14 is secured to the shaft 11 in any suitable manner. A thrust washer 16 is secured to the hub of the wheel 14 and bears against the base 15. The wheel 14 has two upstanding pins 17 and 18 thereon which are disposed diametrically opposite each other, or in other words, the pins are one hundred and eighty degrees apart. The pins 17 and 18 cooperate with a Geneva 19 having a hub 20 and an arbor 21 on the hub. The pins 17 and 18 are normally out of engagement with the Geneva 19. This enables straightaway driving of the vehicle without activating a signal. Pin 17 operates the Geneva in making a left turn, and pin 19 operates the Geneva in making a right turn. The arbor projects downwardly through a shouldered hole in the base 15, said hub also being received in the hole and resting on a thrust roller bearing 22 supported by the base 15. An insulator disk 23 is loosely keyed to the arbor 21 by a key 24 on the arbor. The disk 23 is disposed below the base 15 and carries a spring loaded switch contact member 25 near its periphery. This contact member cooperates with two arcuate or sector shape brass switch contact plates 26 and 27 secured to the underside of the base 15 in spaced and insulated relation with respect to each other.

A traveling collector link 28 is electrically secured to the lower end of the contact member 25 by nuts 29. The link 28 has an apertured end 30 which is disposed between two dished washers 31. A stationary conductor link 32 has one apertured end disposed between two washers 33 and 34 on a screw 35, the screw extending loosely through said end. Spacer washers 36 and 37 are interposed between one of the washers 31 and the end of the arbor 21. A snap ring 38 engages the disk 23 and the arbor 21 preventing withdrawal of the latter from the disk. The washers 33 and 37 are dielectric, and the washers 34 and 36 are made of metal. The screw 35 is threaded in a tapped hole in the lower end of the arbor thereby frictionally and resiliently holding the parts assembled for electrical connection of the contact member 25 with the stationary link 32.

The pins 17 and 18 cooperate with the Geneva 19 causing it to turn the disk 23 and to thus move the contact member 25 in response to the turning movement of the steering wheel in either direction.

An insulator block 40 has grooves therein to accommodate the outer end of the link 32 and the lead wires 41, 42 and 43 from the link 32, contact member 26 and contact member 27, respectively. The block 40 is secured to the base 15 by bolts 44.

The housing 13 includes a removable top cover 45 of lucite and a removable bottom cover 46. The cover 45 is held in place by the bolts 44. The cover 46 may be held in place in any suitable manner.

Figure 10:
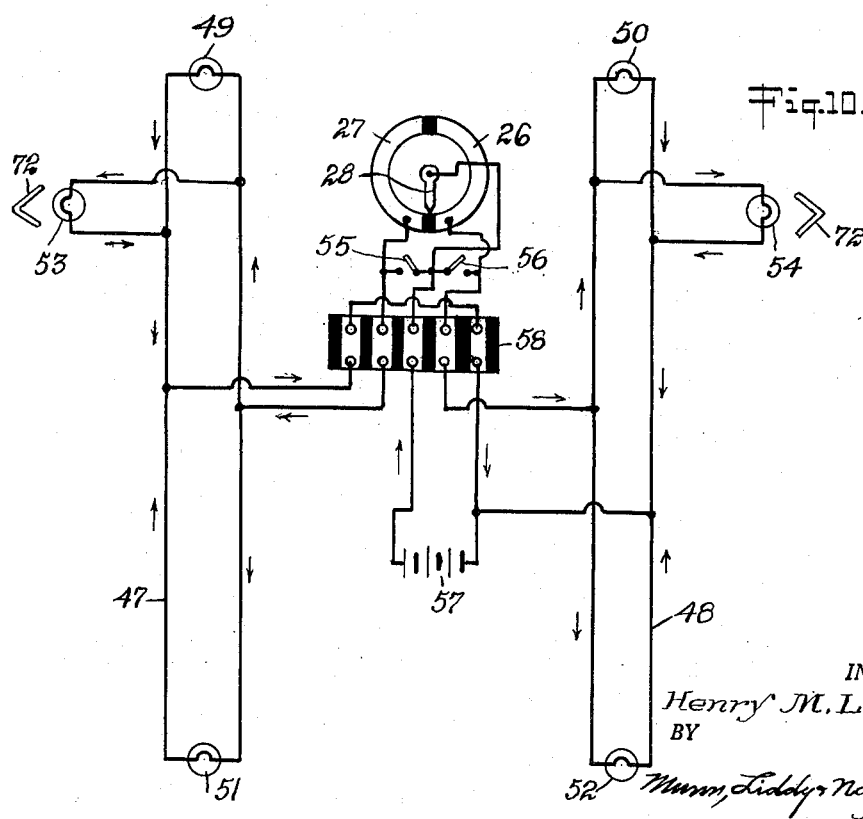
Fig. 10 is a circuit wiring diagram of the signal.

The leads 41, 42 and 43 are feed wires which are electrically included in left and right circuits 47 and 48 respectively, and in which circuits front lamps 49 and 50, rear lamps 51 and 52, side lamps 53 and 54, and manual blinker switches 55 and 56 are connected in parallel with a source of electrical energy 57 by a junction box 58, as shown in Fig. 10.

One of the blinker switches is shown in Fig. 7. Each such switch comprises a spring loaded push rod 59 on a bracket 60. The rod 59 has a plurality of axially arranged cams 61 which operate a bridge 62 in cooperation with terminals 63 and 64 connected with the wires 41 and 43 or 42 and 43, as the case may be.

Figure 9:
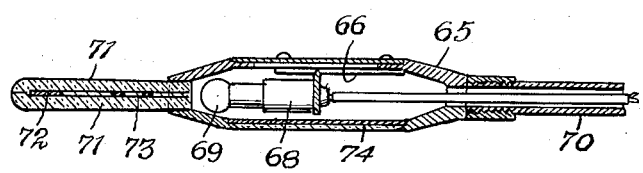
Fig. 9 is a longitudinal sectional view through the lamp shown in Fig. 8.

One of the side lamps is shown in Figs. 8 and 9. Each such lamp is a directional signal lamp. It comprises a circular casing 65 having front and rear openings therein. A bracket 66 is removably secured to the casing 65, as at 67, and disposed within the casing. The bracket carries an electrical socket 68 for a bulb lamp 69. The conductors to the socket pass through a tube 70 secured to the casing 65 in communication with the interior thereof. Two pointed pieces 71 of lucite or other suitable transparent material which glows or becomes illumined from light rays are secured to the casing side by side and project laterally therefrom. The opposed faces of the pieces 71 are recessed to receive colored arrow shaped and ring design elements 72 and 73 respectively. The element 72 with the pieces 71 simulate an arrow. The light from the lamp 69, as well as reflected light from the bracket 66 illuminate the pieces 71. A rear view mirror 74 is secured to the casing 65 in the front opening therein.

From the foregoing it will be understood that when the steering wheel 10 is turned to the left approximately ninety degrees, the Geneva will be turned clockwise by the pin 17 through the intervention of the wheel 14. This will cause the disk 23 to turn a predetermined degree causing the contact member 25 to contact the plate 27 with the result that the lamps 49, 51 and 53 will be lighted. Due to the play of the steering wheel there will be no yaw of the traction wheels when the lamps are lighted indicating a left turn is about to be made in a driving direction, or that the vehicle is about to move to the left from a parked position. The steering wheel may be turned beyond the ninety-degree angle to its full range without affecting the lamps. A right turn of the steering wheel will cause the illumination of the lamps 50, 52 and 54 in a manner and for purposes believed to be obvious from the foregoing explanation of the operation with respect to a left turn.

If desired the manual switch 55 or 56 may be operated to produce the desired signals in which the corresponding lamps, left or right, blink to attract the attention of drivers of other vehicles regarding changes in the direction of travel of the signaling vehicle.

It is to be understood that the pins 17 and 18 may be set in adjusted positions on the wheel 14 to operate the Geneva in less than a ninety-degree turn of the steering wheel. This is indicated in dot and dash lines in Fig. 5, wherein the pins 17 and 18 are shown advanced to operate at approximately eighty degrees.

It is further to be understood that the invention includes all constructions and modifications coming within the scope of the appended claims.

I claim:

1. The combination with the steering shaft of a steering column, of a device for controlling the operation of a travel direction signal, including a wheel secured to said shaft, a fixed insulator base, a Geneva mounted in said base, pins on said wheel diametrically opposite each other which are normally out of engagement with said Geneva and which cooperate with said Geneva in response to the turning movement of said wheel by the shaft, spaced arcuate contact plates insulated from each other on said base, and a contact member mounted on said Geneva and insulated therefrom, said contact member being engageable with one of said contact plates when the Geneva is turned by one of said pins upon turning movement of the shaft in one direction, and said contact member also being engageable with the other one of said plates when the Geneva is turned by the other one of said pins upon turning movement of the shaft in the opposite direction.

2. The combination as set forth in claim 1, wherein each of said pins turns the Geneva upon corresponding turning movement of the shaft after the shaft has turned approximately ninety degrees.

3. The combination as set forth in claim 1, a stationary conductor link secured to said base, a second conductor link electrically connected with said contact member and projecting radially therefrom, and means carried by said Geneva establishing electrical connection of said links.

4. The combination as set forth in claim 3, wherein said last means comprises a member on the Geneva arranged coaxially thereof, said coaxial member extending through the conductor link connected with the contact member, and washers on the coaxial member, some of the washers opposing one of the links and some washers opposing the other link.

HENRY M. LEONARD.

References Cited in the file of this patent

UNITED STATES PATENTS

| Number | Name | Date |
|---|---|---|
| 1,304,370 | Ray | May 20, 1919 |
| 1,415,465 | Nigh | May 9, 1922 |
| 1,637,218 | Eckert | July 26, 1927 |
| 1,850,549 | Johnson | Mar. 22, 1932 |
| 2,161,336 | Cittell | June 6, 1939 |
| 2,275,488 | Bachmann | Mar. 10, 1942 |